(12) United States Patent
Nishioka

(10) Patent No.: US 6,270,365 B1
(45) Date of Patent: Aug. 7, 2001

(54) IC CARD CONNECTOR HAVING IC CARD EJECTION MECHANISM

(75) Inventor: Toru Nishioka, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/756,322

(22) Filed: Jan. 8, 2001

(30) Foreign Application Priority Data

Jan. 17, 2000 (JP) .................................................. 12-010321

(51) Int. Cl.$^7$ .................................................. H01R 13/62

(52) U.S. Cl. .................................................. 439/159

(58) Field of Search .................................. 439/157, 159, 439/160

(56) References Cited

U.S. PATENT DOCUMENTS

| | | | |
|---|---|---|---|
| 5,573,413 | * 11/1996 | David et al. | 439/159 |
| 5,871,365 | * 2/1999 | Kajiura | 439/159 |
| 5,993,227 | * 11/1999 | Hsia et al. | 439/159 |
| 6,036,514 | * 3/2000 | Nishioka | 439/159 |
| 6,042,401 | * 3/2000 | Oguchi et al. | 439/159 |
| 6,042,403 | * 3/2000 | Nishioka | 439/159 |
| 6,089,891 | * 3/2000 | Nishioka | 439/159 |
| 6,095,835 | * 8/2000 | Oguchi | 439/159 |

FOREIGN PATENT DOCUMENTS

Hei 11-135192  5/1999 (JP).

* cited by examiner

Primary Examiner—Tulsidas Patel
(74) Attorney, Agent, or Firm—Brinks Hofer Gilson & Lione

(57) ABSTRACT

The present invention provides an IC card connector having a mechanism for ejecting an IC card, wherein the IC card connector, when an IC card is inserted, holds a slide member in an IC card loaded position without fail by a locking member, and, when the IC card is ejected, ejects the IC card without fail by operating the slide member. The IC card connector includes a slide member that is slidable in a direction in which an IC card loaded in and unloaded from a housing is inserted and ejected; a return spring for energizing the slide member in the direction in which the IC card is ejected; and a locking member for holding the slide member in the position in which the IC card is loaded, against an energizing force of the return spring, wherein the locking member comprises: an anchoring part that is turnably supported and can be engaged in and disengaged from the slide member; a turning operation part for turning the anchoring part in a direction in which the anchoring part is disengaged from the slide member; and a pressing operation part that abuts the slide member, and engages the anchoring part in the slide member in accordance with the movement of the slide member in the IC card insert direction and presses the slide member in the IC card eject direction in accordance with the movement of the turning operation part.

6 Claims, 13 Drawing Sheets

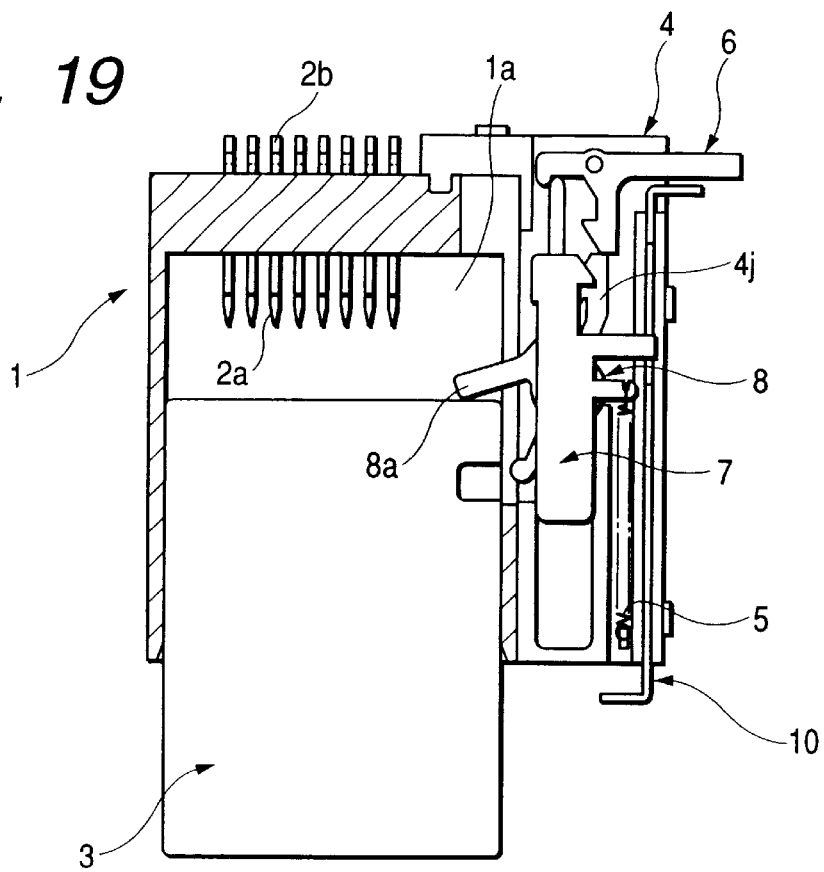
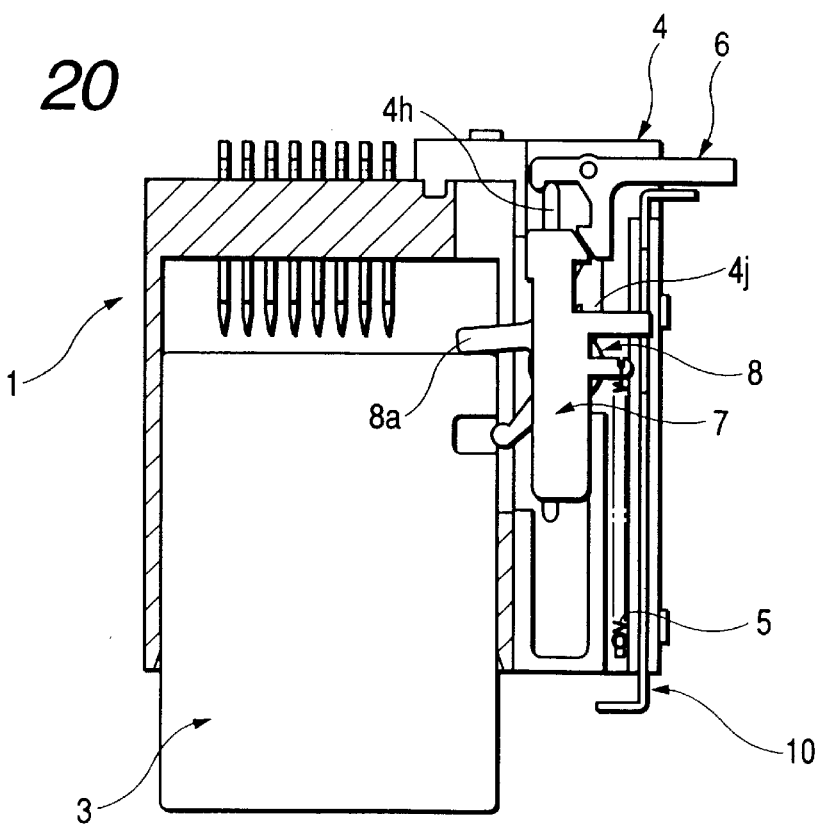

IC CARD CONNECTOR HAVING IC CARD EJECTION MECHANISM

BACKGROUND OF THE INVENTION

1. Field of the Invention

The present invention relates to the construction of an IC card connector used with a PC card used as a storage medium of personal computers or the like and a CF (compact flash) card used in a digital camera and other electronic apparatuses.

2. Description of the Prior Art

An IC card connector is commonly used as an additional storage unit of a personal computer. An IC card is coming into widespread use as a storage medium of the IC card connector.

The IC card is loaded in the IC card connector to write and read necessary information. To increase operability in loading and unloading the IC card, some IC card connectors have an ejection mechanism for ejecting the IC card.

It is known that the conventional IC card ejection mechanism includes a slide member for carrying an IC card, a locking member for holding the slide member in an IC card loaded position, and a spring member for energizing the slide member in an eject direction when the locking member is unlocked, wherein, when the IC card is ejected as the slide member moves in the eject direction, the IC card is pushed out in the eject direction by an energizing force of the spring member.

However, the above-described conventional IC card connector has the following problems in terms of construction. First, if the locking member and the slide member are not engaged in each other successfully when an IC card is inserted, the IC card cannot be held in the loaded position. Second, where the locking member and the slide member are disengaged from each other when the IC card is ejected, the IC card cannot be ejected if the slide member does not move due to static friction.

SUMMARY OF THE INVENTION

For this reason, the present invention intends to solve the above problems by providing an IC card connector having a mechanism for ejecting an IC card, wherein the IC card connector, when an IC card is inserted, holds a slide member in an IC card loaded position without fail by a locking member, and, when the IC card is ejected, ejects the IC card without fail by operating the slide member.

To solve the above problems, an IC card connector of the present invention, as a first means, includes: a slide member that is slidable in directions in which an IC card loaded in and unloaded from a housing is inserted and ejected; a return spring for energizing the slide member in the direction in which the IC card is ejected; and a locking member for holding the slide member in the position in which the IC card is loaded, against an energizing force of the return spring, wherein the locking member comprises: an anchoring part that is turnably supported and can be engaged in and disengaged from the slide member; a turning operation part for turning the anchoring part in a direction in which the anchoring part is disengaged from the slide member; and a pressing operation part that abuts the slide member, and engages the anchoring part in the slide member in accordance with the movement of the slide member in the IC card insert direction and presses the slide member in the IC card eject direction in accordance with the movement of the turning operation part.

As a second means, the anchoring part, the turning operation part, and the pressing operation part are formed integrally with the locking member.

As a third means, at one end of the slide member are formed an engaging projection part engaged in the anchoring part and a pressing part abutting the pressing operation part, wherein, when the slide member is moved in the IC card insert direction and the anchoring part and the engaging projection part are engaged in each other, the locking member is turnably supported on a fixing member so that the pressing operation part and the pressing part are opposed to each other in a position close to each other.

As a fourth means, the fixing member is formed on the housing or a frame attached to the housing.

As a fifth means, the slide member is provided with a turnable eject arm, which is engaged in the IC card loaded in or unloaded from the housing, whereby as the IC card is inserted or ejected, the slide member slides in an insert or eject direction through the eject arm.

As a sixth means, first and second arm parts are formed on the eject arm, and when the IC card is inserted, the first arm part engages in the IC card and thereby the slide member is moved in an IC card insert direction; and when the IC card is ejected, the second arm part engages in the IC card and thereby the slide member is moved in an IC card eject direction, while, when the slide member has been moved up to an IC card eject position, the eject arm turns, whereby the IC card can be pulled out.

BRIEF DESCRIPTION OF THE DRAWINGS

Preferred embodiments of the present invention will be described in detail based on the followings, wherein:

FIG. 19 shows an initial state in which the IC card is inserted in the housing;

FIG. 20 shows a state in which the IC card is being inserted in the housing;

DESCRIPTION OF THE PREFERRED EMBODIMENTS

Figure 1:
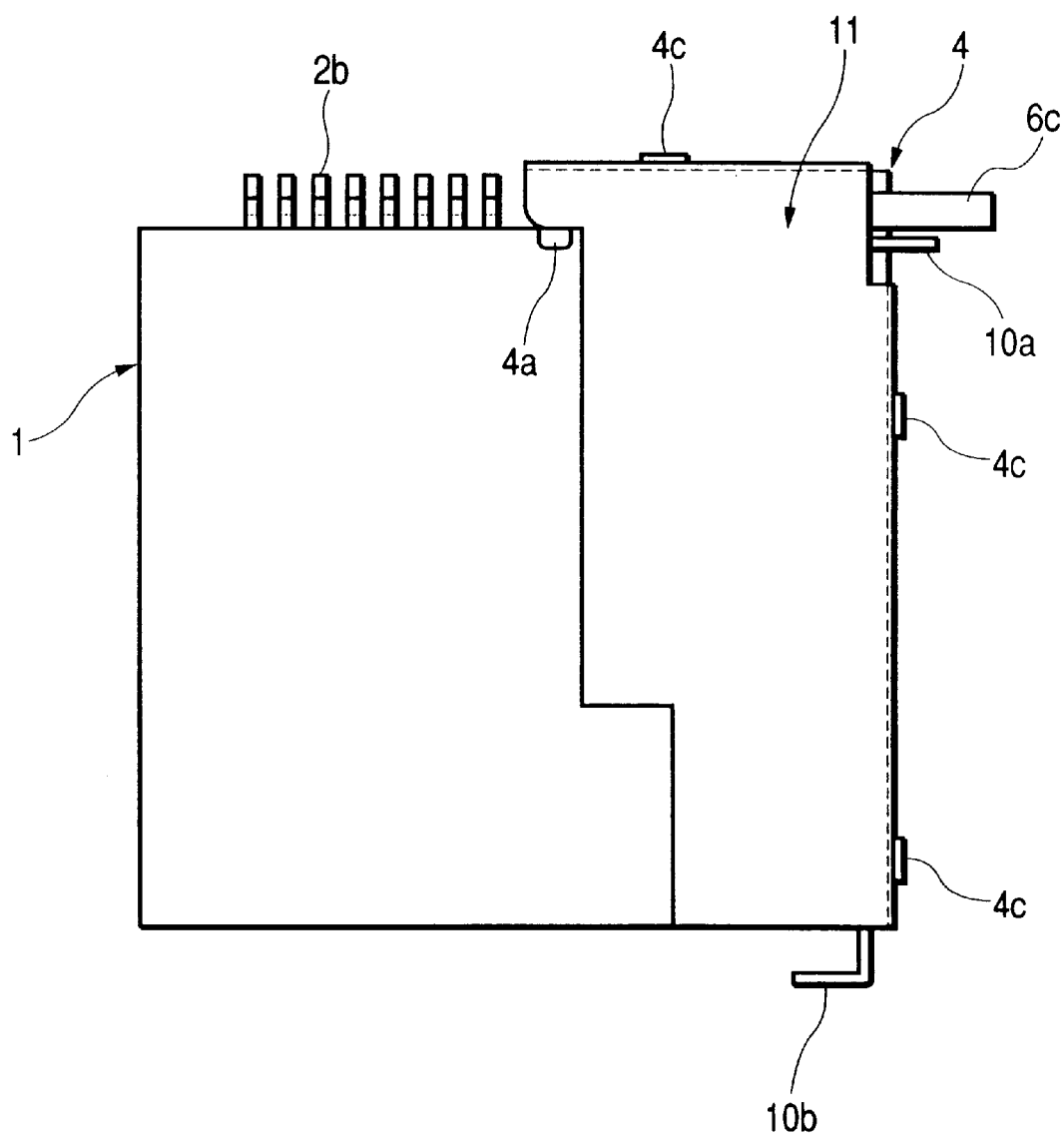
FIG. 1 is a plan view showing an IC card connector of an embodiment of the present invention.
Figure 2:
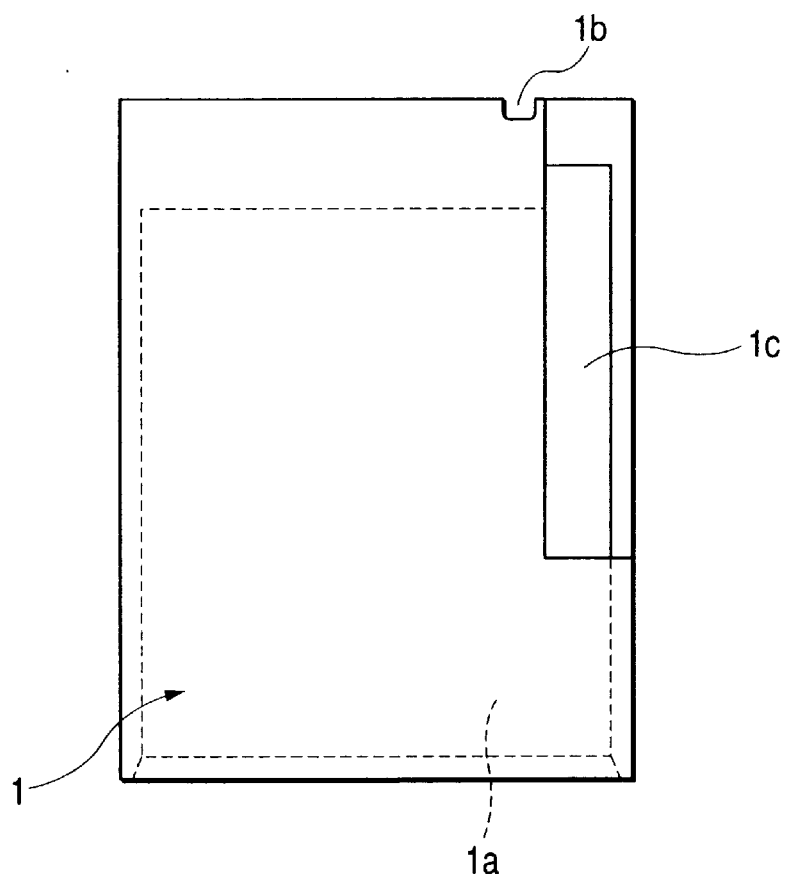
FIG. 2 is a plan view showing a housing of the IC card connector of the present invention.
Figure 3:
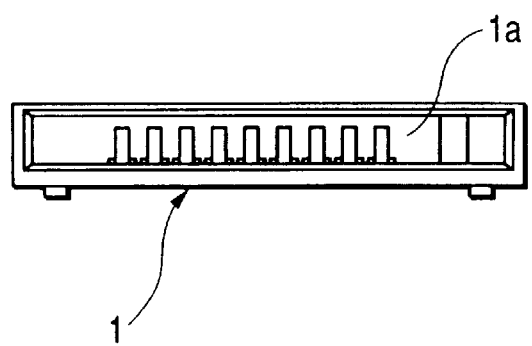
FIG. 3 is a front view showing the housing.
Figure 4:
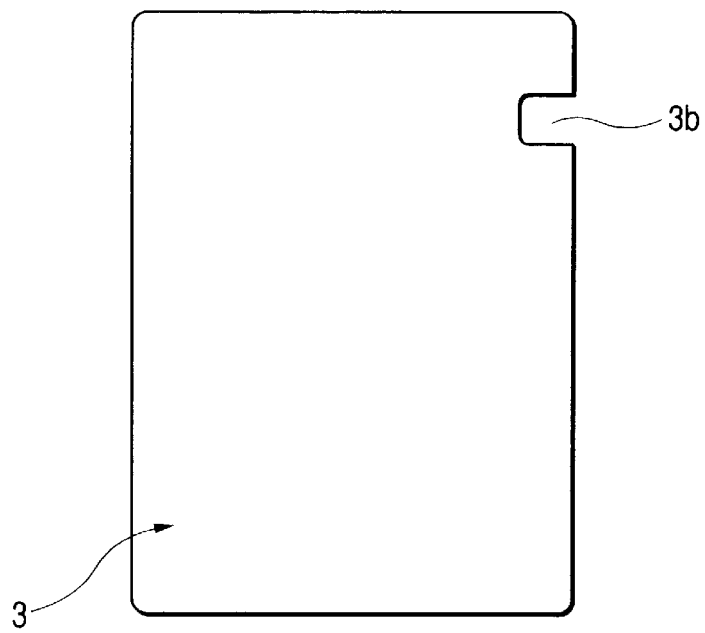
FIG. 4 is a plan view showing an IC card of the IC card connector.
Figure 5:
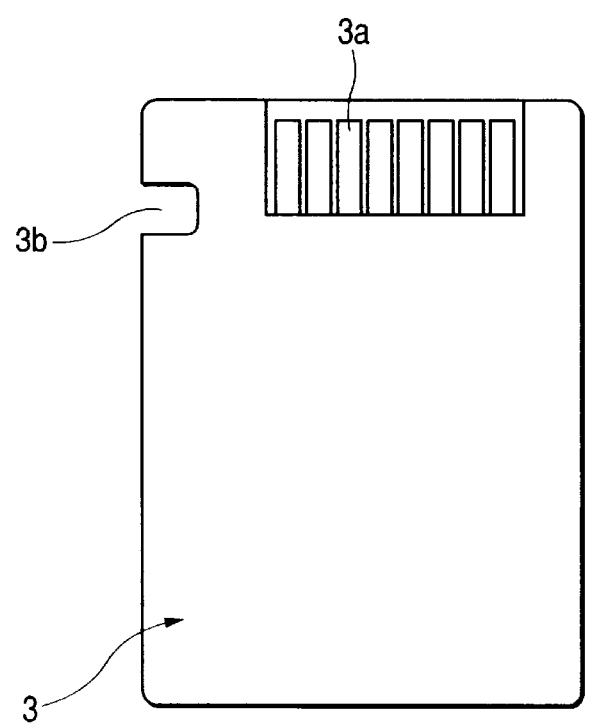
FIG. 5 is a bottom view showing the IC card.
Figure 6:
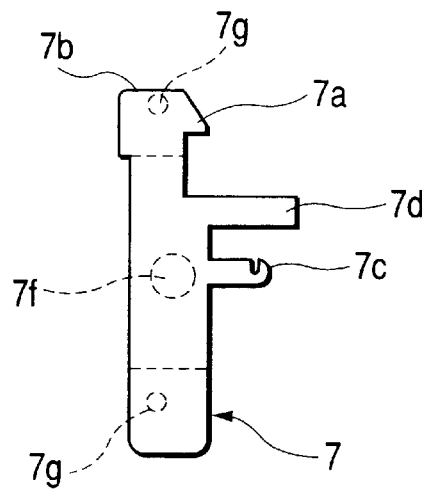
FIG. 6 is a plan view showing a slide member of the IC card connector.
Figure 7:
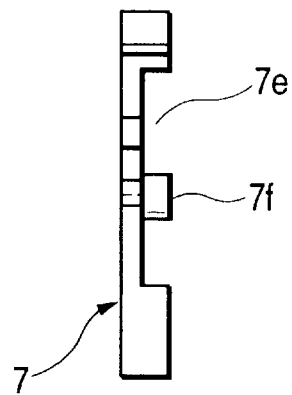
FIG. 7 is a side view showing the slide member.
Figure 8:
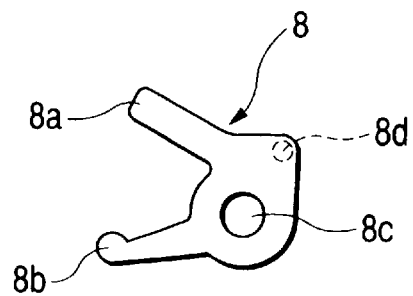
FIG. 8 is a plan view showing an eject arm of the IC card connector.
Figure 9:
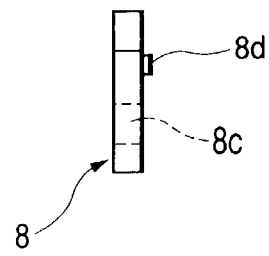
FIG. 9 is a side view showing the eject arm.
Figure 10:
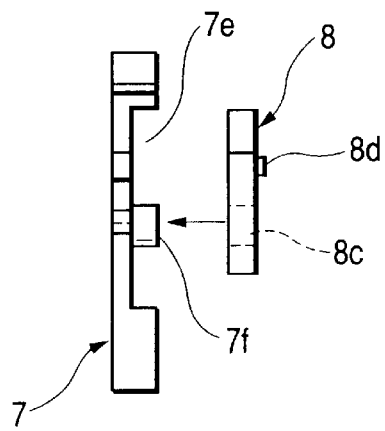
FIG. 10 illustrates a slide unit part of the IC card connector.
Figure 11:
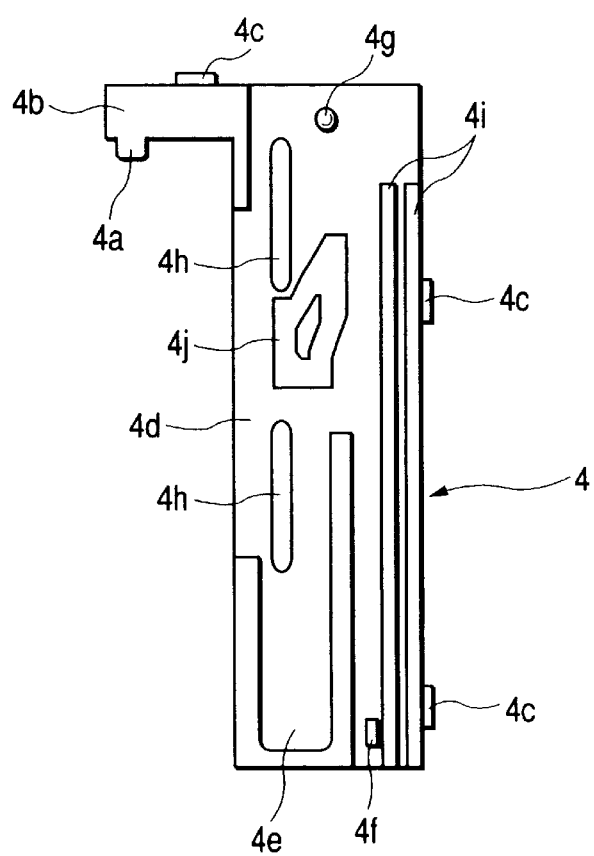
FIG. 11 is a plan view showing a frame of the IC card connector.
Figure 12:
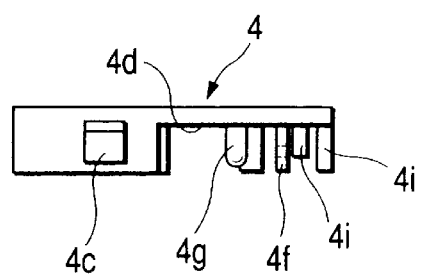
FIG. 12 is a top view showing the frame.
Figure 13:
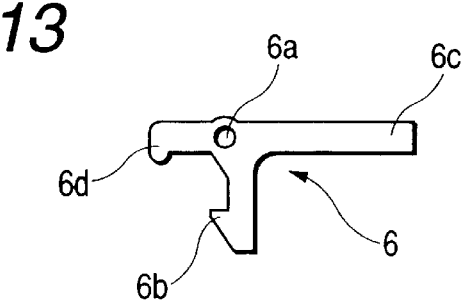
FIG. 13 is a plan view showing a locking member of the IC card connector.
Figure 14:
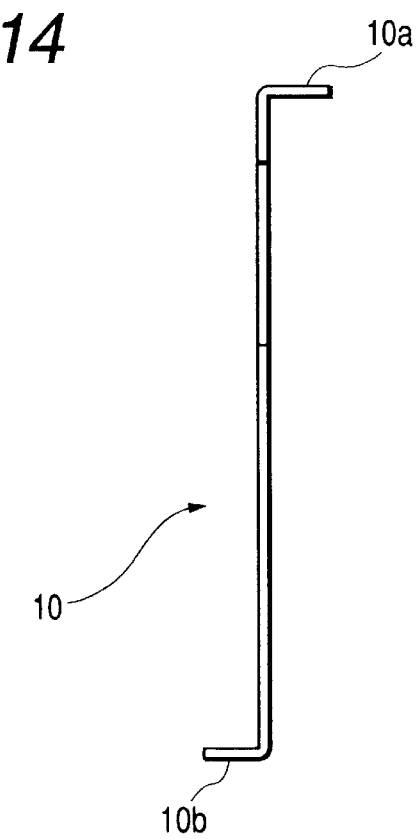
FIG. 14 is a plan view showing an unlocking member of the IC card connector.
Figure 15:
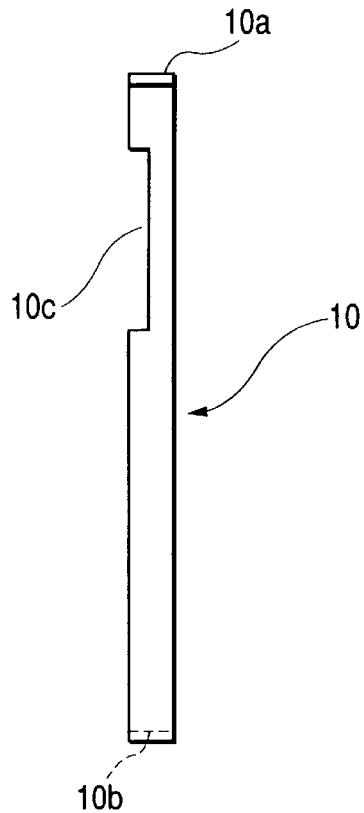
FIG. 15 is a side view showing the unlocking member.
Figure 16:
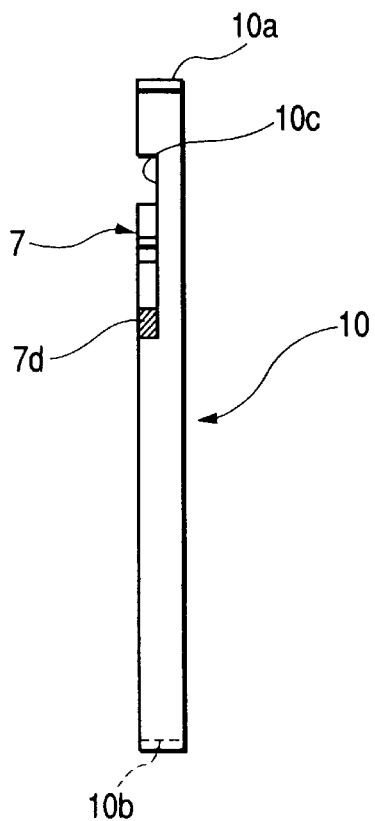
FIG. 16 illustrates the fit between the unlocking member and the slide member of the present invention.
Figure 17:
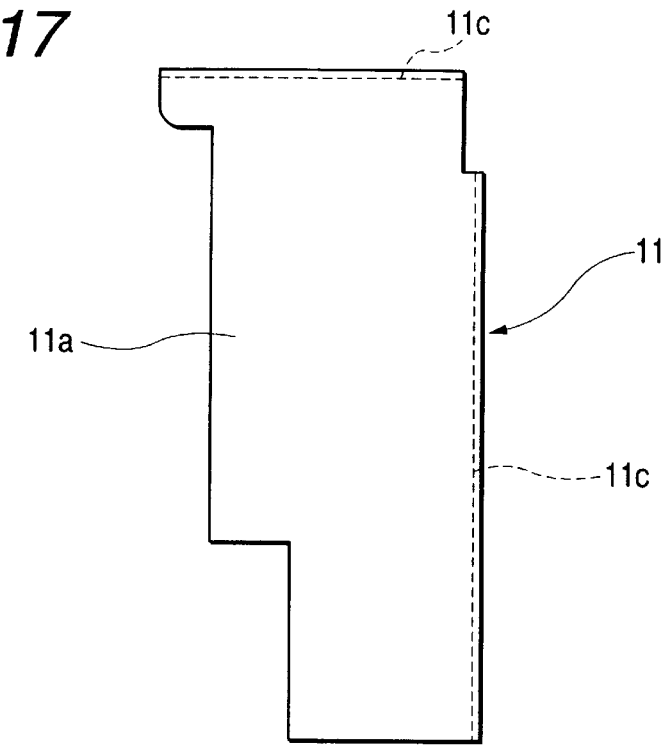
FIG. 17 is a plan view showing a cover of the present invention.
Figure 18:
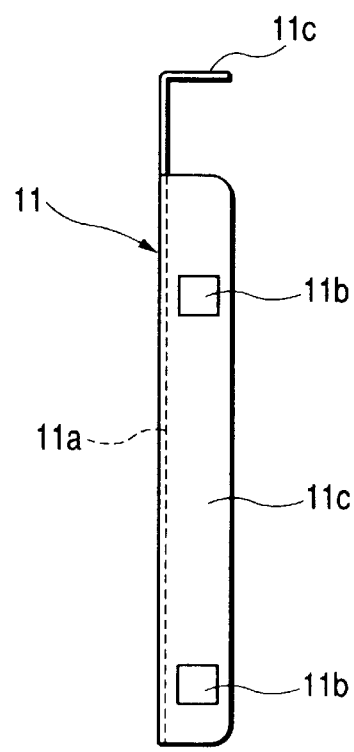
FIG. 18 is a side view showing the cover.

Hereinafter, one embodiment of the present invention is shown in FIGS. 1 to 28. FIG. 1 is a plan view showing an IC card connector of the present invention; FIG. 2 is a plan view of a housing; FIG. 3 is a front view of the same; FIG. 4 is a plan view of an IC card; FIG. 5 is a bottom view of the housing; FIG. 6 is a plan view of a slide member; FIG. 7 is a side view of the same; FIG. 8 is a plan view of an eject arm; FIG. 9 is a side view of the same; FIG. 10 illustrates a slide unit part; FIG. 11 is a plan view of a frame; FIG. 12 is a top view of the same; FIG. 13 is a plan view of a locking member; FIG. 14 is a plan view of an unlocking member; FIG. 15 is a side view of the same; FIG. 16 illustrates the fit between the unlocking member and the slide member; FIG. 17 is a plan view of a cover; and FIG. 18 is a side view of the same.

In the drawings, the housing 1 is made of an insulating material such as a synthetic resin and is provided with an internal housing part 1a in which an IC card 3 to be described later is inserted and housed. Plural contact terminals 2a made of conductive metallic materials are disposed on the inside bottom of the housing part 1a, and at the other ends of the contact terminals 2a are formed connection terminals 2b that are guided outwardly of the housing 1 and are connected with a circuit pattern such as an external circuit board not shown.

At one end of the housing 1 is formed a concave fixing part 1b for fixing a frame 4 to be described later to the housing 1 in engagement with the frame 4. A notch 1c is formed at one end of the housing 1 in the vicinity of the concave fixing part 1b, helping to prevent hindrance to the turn of arm parts 8a an 8b of an eject arm 8 to be described later during the turning of the eject arm 8.

The IC card 3, which internally houses integrated circuits (IC), is widely used as a storage medium. At the bottom of the IC card 3, plural contact parts 3a are formed at one end of the IC card 3, and the contact part 3a contact the plural contact terminals 2a provided in the housing part 1a of the housing 1, and thereby various types of information processing are performed with an electronic apparatus externally connected.

The IC card 3 is, at one side thereof, provided with a concave part 3b in which a second arm part 8b of the eject arm 8 to be described later is engaged.

The frame 4 is nearly rectangular made of an insulating material such as a synthetic resin, and at the tip of the frame 4 is provided a fixing arm part 4b having a fixing projection part 4a, installed integrally with the housing 1 in engagement with the concave fixing part 1b of the housing 1. Plural engaging claws 4c for engaging a cover 11 to be described later are provided in the circumference of the frame 4.

A concave flat part 4d is provided at a nearly central part of the frame 4 and a slide member 7 to be described later is disposed in the flat part 4d. A concave anchoring part 4e in which a coil spring 9 to be described later is anchored is provided in a lower portion of the flat part 4d, and in parallel to the concave engaging part 4e is provided a hook 4f for anchoring a return spring 5 for returning the slide member 7.

An anchoring shaft 4g for anchoring a locking member 6 to be described later is provided in an upper portion of the flat part 4d, a sliding slot 4h in which a sliding projection 7g of the slide member 7 slides is provided in the center of the flat part 4d, and a pair of guide walls 4i for sandwiching an unlocking member 10 to be described later are formed at one side of the flat part 4d.

A loop-shaped cam slot 4j is provided in the flat part 4d. A cam pin 8d provided in the eject arm 8 engaged in the slide member 7 to be described later is slid in the cam slot 4j, and the cam pin 8d moves within the cam slot 4j in accordance with the movement of the slide member 7, whereby the turning of the eject arm 8 is restrained.

The locking member 6 is made of an insulating material such as a synthetic resin and formed in shape similar to the T character, and at the center of the locking member 6 are formed an anchoring hole 6a anchored to the anchoring shaft 4g of the frame 4 and an anchoring part 6b that can be engaged in or disengaged from the slide member 7 to be described later. A turning operation part 6c for turning the locking member 6 in the direction of disengaging the anchoring part 6b from the slide member 7 is formed at one end of the locking member 6 across the anchoring hole 6a. At the other end of the turning operation part 6c is formed a pressing operation part 6d that abuts the slide member 7 to be described later, engages the anchoring part 6b in the slide member 7 in accordance with the movement of the slide member 7 in an IC card insert direction, and presses the slide member 7 in an IC card eject direction in accordance with an operation of the turning operation part 62c.

The slide member 7, which is made of an insulating material such as a synthetic resin, has, at one end thereof, an engaging projection part 7a engaged with the anchoring part 62b of the locking member 6, and further, at a tip thereof, a pressing part 7b abutted against the pressing operation part 6d of the locking member 6. At the center of the slide member 7 is formed a hook 7c to which one end of the return spring 5 anchored to the frame 4 is anchored, and at the upper surface of the hook 7c is formed an outwardly projected return arm 7d engaged in the unlocking member 10 to be described later.

An opening 7e is provided at a nearly central point of the slide member 7, and at the center of the opening 7e is projectingly provided a shaft 7f to which the eject arm 8 to be described later is rotatably attached. The sliding projections 7g slid in the sliding slot 4h of the frame 4 are formed in both ends of the slide member 7.

The slide member 7, disposed within the flat part 4d of the frame 4, is installed to be movable vertically, that is, in the directions in which the IC card 3 is inserted and ejected.

The eject arm 8 is made of an insulating material such as a synthetic resin and formed in shape similar to disk, and has first and second arm parts 8a and 8b extended outwardly from the disklike shape. The first arm part 8a is provided to be engaged in the front end of the IC card 3 when the IC card 3 is inserted. The second arm part 8b has an tip part whose shape is nearly circular, and is engaged with the concave part 3b formed at one side of the IC card 3 and is provided to be engaged or disengaged while turning within the concave part 3b.

The eject arm 8 has an shaft hole 8c formed at the center thereof, and the shaft hole 8c is fitted into the shaft part 7f formed in the slide member 7, whereby the eject arm 8 can be rotated around the shaft part 7f. On one side of the eject arm 8 is provided a pin-shaped cam pin 8d moving within the cam slot 4h provided on the frame 4. (FIG. 10)

The coil spring 9, which is made of a metallic material and housed in the concave anchoring part 4e of the frame 4, serves both as a stopper when the slide member 7 moves in an IC card eject direction, and as an energizing member for energizing the slide member 7 in the insert direction.

The unlocking member 10 is made of a metallic plate and formed in shape similar to the Z character. The unlocking member 10 is flatly bent at each end thereof, and at one end thereof is formed an unlocking operation part 10a that abuts the turning operation part 6c of the locking member 6 and turns the locking member 6, and at another end is formed a jig operation part 10b operated from the outside by a jig or the like. A long notch groove 10c is formed at the center of the unlocking member 10 and a return arm part 7d of the slide member 7 is slidably fitted in the notch groove 10c.

The unlocking member 10 is incorporated in the frame 4 together with the slide member 7 and sandwiched between a pair of the guide walls 4i of the frame 4, and sliding resistance with the guide walls 4i prevents movement due to vibration applied from the outside to an electronic apparatus or the like.

The cover 11, made of a metallic plate material, has a flat upper plate part 11a, and side plate parts 11c which are bent at right angles from the upper plate part 11a and have plural anchoring windows 11b engaged in the engaging claws 4c of the frame 4. The cover 11 is provided on the upper surface of the frame 4 to cover opening parts of the frame 4.

Next, the operation of the IC card connector described above will be described with reference to FIGS. 19 to 28.

Figure 21:
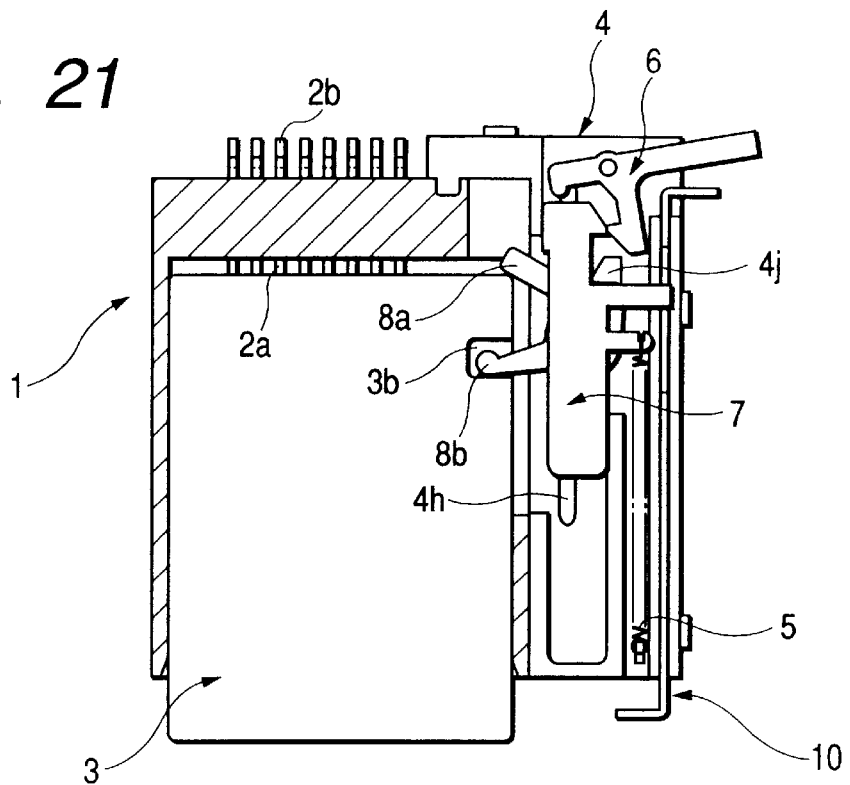
FIG. 21 shows a state in which the IC card is being inserted immediately before a slide member and a locking member are engaged in each other.
Figure 22:
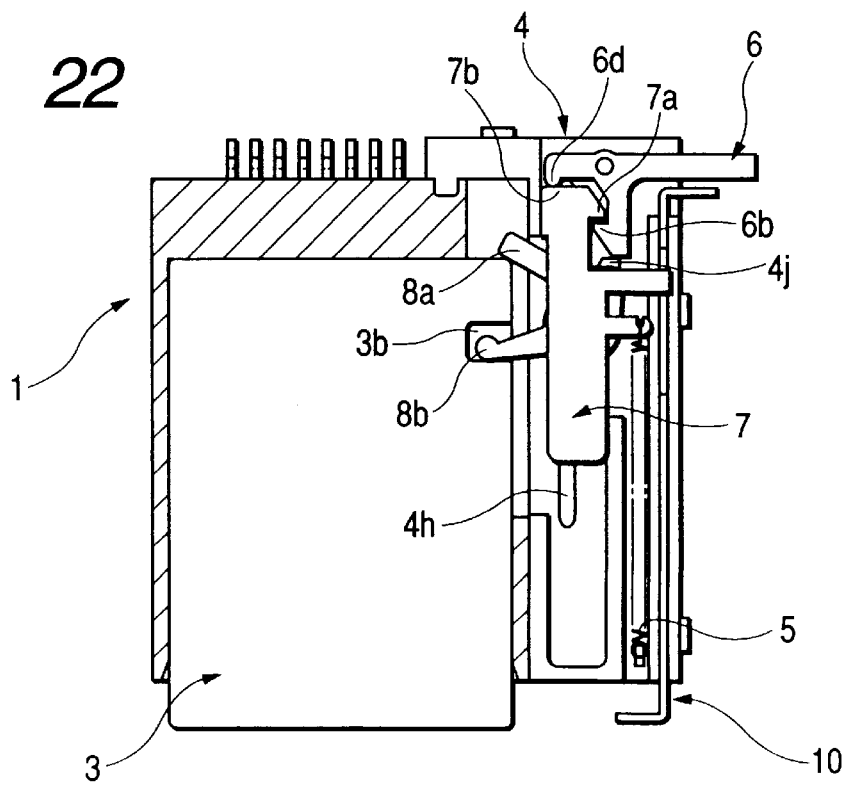
FIG. 22 shows a state in which the IC card has been inserted.
Figure 23:
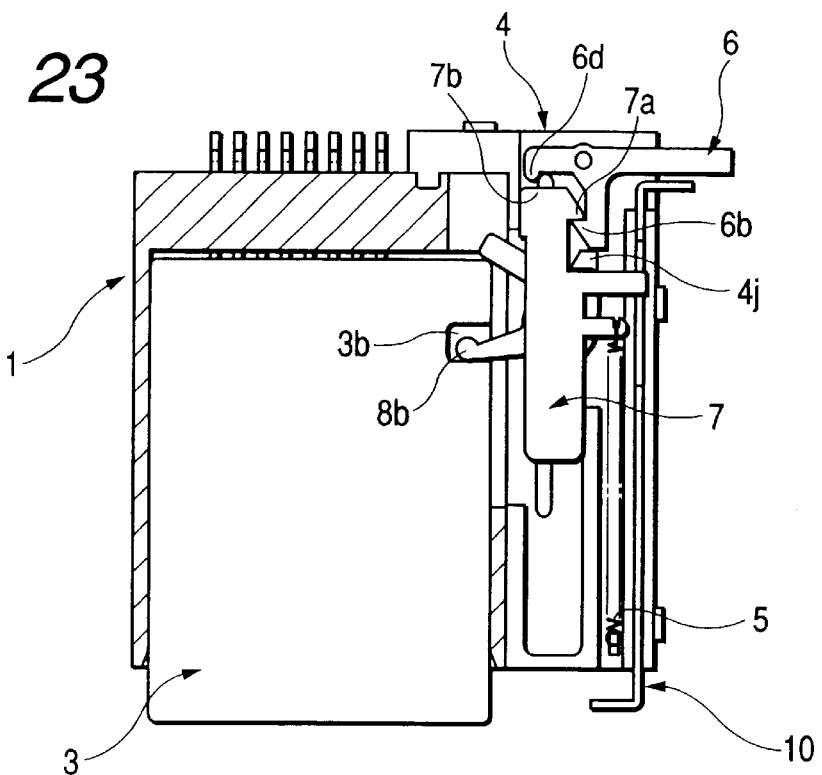
FIG. 23 shows a state in which the IC card has been inserted and the slide member has been locked.
Figure 24:
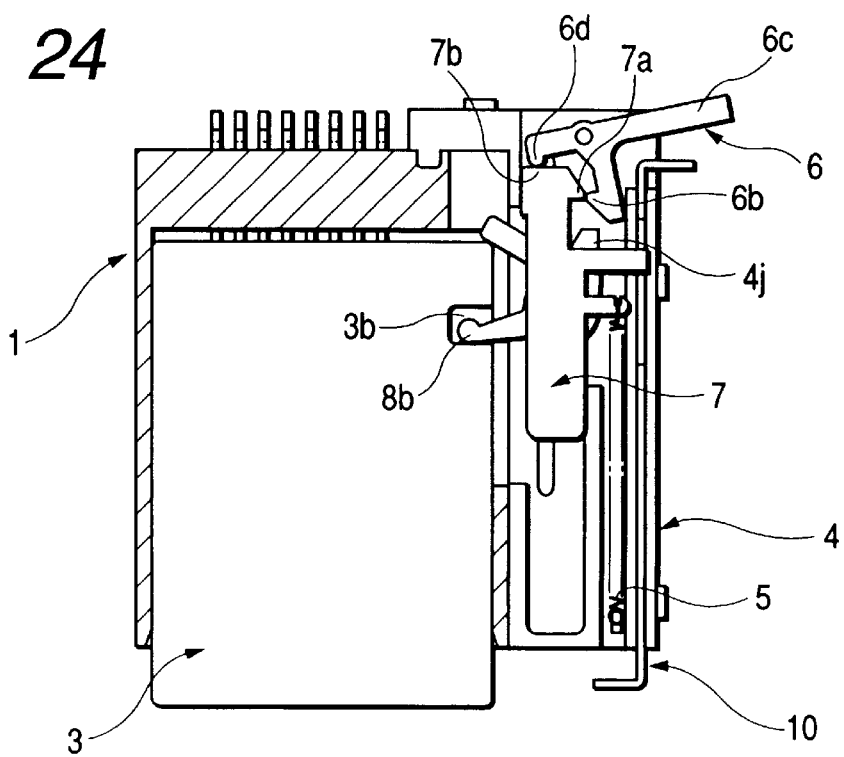
FIG. 24 shows a state in which the locked slide member is unlocked.
Figure 25:
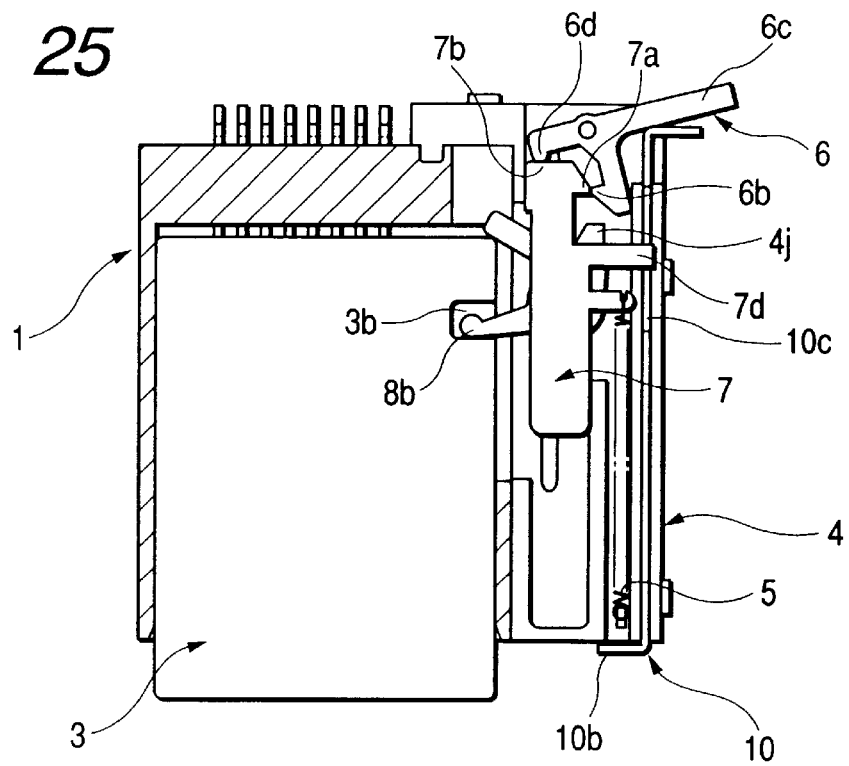
FIG. 25 shows a state in which the locked slide member is forcibly unlocked by an unlocking member.
Figure 26:
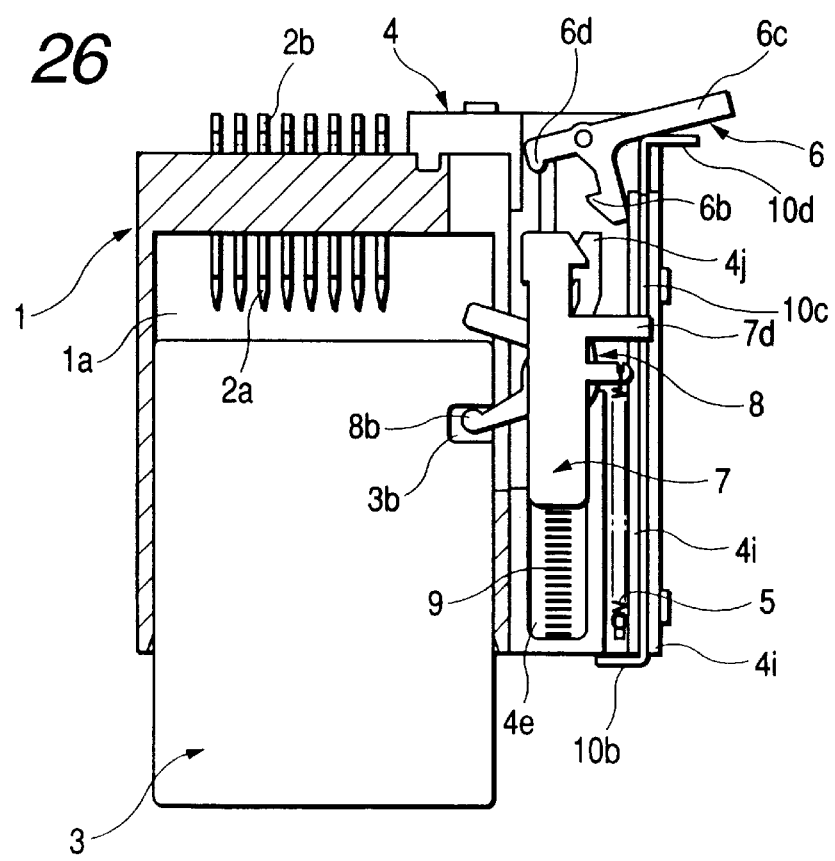
FIG. 26 shows a state in which the IC card has been ejected to an eject position.
Figure 27:
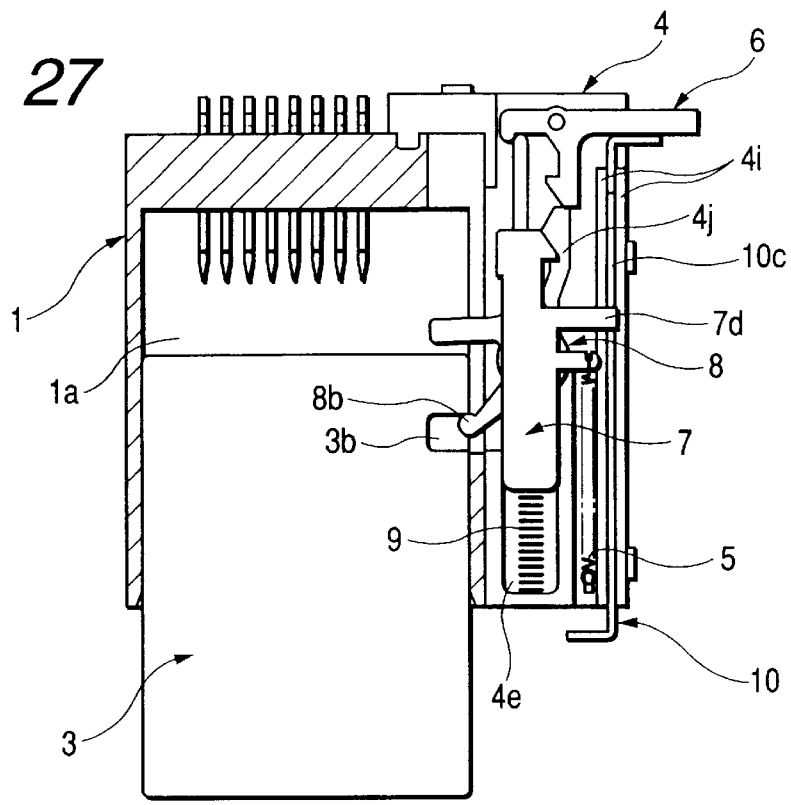
FIG. 27 shows a state in which the IC card is pulled forward from the eject position.
Figure 28:
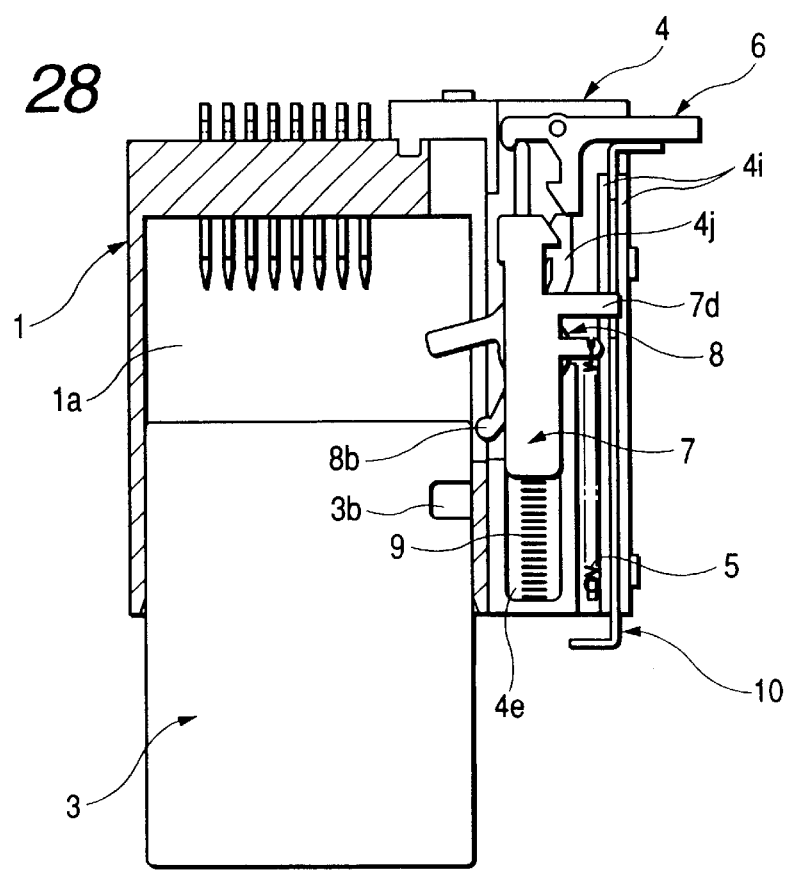
FIG. 28 shows a state in which the IC card is ejected disengaged from a second arm part.

FIGS. 19 to 28 illustrate insert/eject operations of the IC card connector: FIG. 19 shows an initial state in which the IC card is inserted in the housing; FIG. 20 shows a state in which the IC card is being inserted; FIG. 21 shows a state in which the IC card is being inserted immediately before a slide member and a locking member are engaged in each other; FIG. 22 shows a state in which the IC card has been inserted; FIG. 23 shows a state in which the IC card has been inserted and the slide member is locked; FIG. 24 shows a state in which the locked slide member is unlocked; FIG. 25 shows a state in which the locked slide member is forcibly unlocked by an unlocking member; FIG. 26 shows a state in which the IC card has been ejected to an eject position; FIG. 27 shows a state in which the IC card is pulled forward from the eject position; and FIG. 28 shows a state in which the IC card is ejected disengaged from a second arm part.

First, the IC card 3 is inserted in the housing part 1a of the housing 1. At this time, the first arm part 8a of the eject arm 8 abuts the tip of the IC card 3 and is pressed in an IC card insert direction. (FIG. 19) At this time, since a cam pin 8d of the eject arm 8 is restrained in motion by the cam slot 4j of the frame 4, the first arm part 8a is not turned in the IC card insert direction and the slide member 7 moves in the IC card insert direction against an energizing force of the return spring 5. At this time, the cam pin 8d provided on the eject arm 8 moves within the cam slot 4j provided on the frame 4, so that the eject arm 8 moves by a certain distance in restrained mode in the IC card insert direction. (FIG. 20)

When the IC card 3 is further pressed in the insert direction against the energizing force of the return spring 5, the slide member 7 moves in the IC card insert direction and the cam pin 8d moves within the cam slot 4j. At this time, the eject arm 8 turns by a certain distance in the IC card insert direction, whereby the second arm part 8b is engaged in a concave part 3b of the IC card 3. At this time, the contact part 3a of the IC card 3 is brought into contact with the contact terminals 2a of the housing 1. At this time, the locking member 6 turns a little counterclockwise in accordance with the movement of the slide member 7. (FIG. 21)

Next, when the IC card 3 is further pressed in the insert direction, the cam pin 8d moves in the IC card insert direction along the cam slot 4j, and when the IC card 3 abuts the inside edge of the housing part 1a of the housing 1, the insertion is stopped, thus completing the loading of the IC card 3 into the housing 1. At the same time, the movement of the slide member 7 and the eject arm 8 is stopped. At this time, since the pressing part 7b at the tip of the slide member 7 abuts the pressing operation part 6d of the locking member 6 and presses the pressing operation part 6d to turn it counterclockwise, the anchoring part 6b of the locking member 6 is correctly opposed to the engaging projection part 7a of the slide member 7. (FIG. 22)

When pressure to the IC card 3 is removed, the slide member 7 is returned only a little in the IC card eject direction by an energizing force of the return spring 5, at which time the engaging projection part 7a is engaged with the anchoring part 6b of the locking member 6, and thereby the slide member 7 is locked at that position. (FIG. 23)

As described above, when the IC card 3 is inserted, the slide member 7 moves in the IC card insert direction, and the pressing part 7b of the slide member 7 presses the pressing operation part 6d of the locking member 6 to turn the locking member 6 clockwise. Thereby, the anchoring part 6b of the locking member 6 and the engaging projection part 7a of the slide member 7 are correctly opposed to each other to ensure that the slide member 7 can be locked at the position in which the IC card is loaded.

Next, to eject the IC card 3 loaded in the housing 1, in the state in which the IC card 3 is loaded (FIG. 23), the turning operation part 6c of the locking member 6 is turned counterclockwise through electrical operations by a solenoid or motor not shown. Thereby, the anchoring part 6b of the locking member 6 is disengaged from the engaging projection part 7a of the slide member 7 and the slide member 7 is moved in the IC card eject direction by an energizing force of the return spring 5. At this time, since the pressing operation part 6d of the locking member 6 presses the pressing part 7b of the slide member 7 in the IC card eject direction, even if the static friction of the slide member 7 is larger than the return force of the return spring 5, the slide member 7 never fails to be moved in the IC card eject direction. (FIG. 24)

Should the locking member 6 be unable to be turned due to a failure of an electrical circuit or for other reasons, it can be turned by operating the unlocking member 10 attached to the frame 7. In this case, in the state in which the IC card 3 is loaded (FIG. 23), the turning operation part 6c of the locking member 6 is turned counterclockwise by the unlocking operation part 10a of the unlocking member 10. Thereby, the anchoring part 6b of the locking member 6 is disengaged from the engaging projection part 7a of the slide member 7 and the slide member 7 is moved in the IC card eject direction by an energizing force of the return spring 5. At this time, although the unlocking member 10 is housed inside a panel of an electric apparatus not shown, the locking member 6 can be easily turned by inserting a jig or the like through a hole provided on the panel and pressing the jig operation part 10b of the unlocking member 10. (FIG. 25)

At this time, as shown in FIG. 16, the unlocking member 10 and the slide member 7 are loosely engaged in each other so that the notch groove 10c and the return arm part 7d can slide past each other, and the return arm part 7d of the slide member 7 is formed so as not to obstruct the movement of the unlocking member 10.

As the slide member 7 moves in the IC card eject direction, the cam pin 8d is moved in the IC card eject direction along the cam slot 4j, and the eject arm 8, the turning of which is restrained, moves in the IC card eject direction along with the slide member 7. The backward end of the slide member 7 abuts the edge of the coil spring 9, whereby the movement of the slide member 7 is stopped and the IC card 3 is stopped at the eject position. (FIG. 26)

At this time, since the second arm 8b is engaged in the concave part 3b of the IC card 3 and the cam pin 8d is restrained in its turning by the cam slot 4j, the IC card 3 moves in the eject direction along with the slide member 7 while being engaged in the second arm part 8b. At this time, the contact part 3a of the IC card 3 is brought out of contact with the contact terminals 2a of the housing 1. (FIG. 26)

In this case, the second arm part 8b is engaged in the concave part 3b of the IC card 3 and the cam pin 8d is restrained in its turning by the cam slot 4j, preventing the IC card 3 from popping out of the housing part 1a of the housing 1 when the slide member 7 is moving in the IC card eject direction from the state in which the IC card is loaded.

When the IC card 3 is further pulled out in that state, the slide member 7 moves forward against an energizing force of the coil spring 9, the cam pin 8d moves in the initial state along the cam slot 4j, and the eject arm 8 becomes turnable in the IC card eject direction. (FIG. 27)

When the IC card 3 is further pulled out in that state, the eject arm 8 is turned in the IC card 3 eject direction. At this time, as the eject arm 8 turns in the IC card eject direction, the second arm part 8b is disengaged from the concave part 3b of the IC card 3 and the IC card 3 is ejected from the housing part 1a of the housing 1. At this time, the slide member 7 moves in the IC card insert direction by the energizing force of the coil spring 9 and returns to the initial state. (FIG. 28)

At this time, as shown in FIG. 16, the unlocking member 10 and the slide member 7 are engaged in each other by the notch groove 10c and the return arm part 7d, and when the slide member 7 is moved to an IC card eject position and stopped therein (FIG. 26), the return arm part 7d abuts one end of the notch groove 10c. With this construction, in accordance with the movement of the slide member 7 in the IC card eject direction from the IC card eject position, the unlocking member 10 is moved in the IC card eject direction, and thereby returns to the initial position. (FIG. 27)

As described above, since the unlocking member 10 is constructed to return to its initial position in accordance with the movement of the slide member 7 when the IC card 3 is pulled out, there is no need to separately provide a spring for returning the unlocking member 10, simplifying the construction of the IC card connector.

Since the unlocking member 10 is sandwiched between the guide walls 4i of the frame 4 to provide sliding resistance, it is resistive to external vibrations and therefore a mechanism for preventing it from swinging need not be provided separately, the IC card connector can be constructionally simplified and prevents the occurrence of malfunctions such as accidental unlocking.

Although, in the above embodiment, the type of an IC card connector in which the contact parts 3a and the contact terminals 2a face each other has been described, it goes without saying that the embodiment is also applicable to IC card connectors of pin/socket type.

As has been described, an IC card connector of the present invention includes a locking member having an anchoring part for holding a slide member in the position in which an IC card loaded in or unloaded from a housing has been loaded, the slide member being slidable in an IC card insert or eject direction, wherein the locking member is provided with: a turning operation part that turns the anchoring part in the direction in which it is disengaged from the slide member; and a pressing operation part that abuts the slide member, and engages the anchoring part in the slide member in accordance with the movement of the slide member in an IC card insert direction, while pressing the slide member in an IC card eject direction in accordance with the movement of the turning operation part. Thereby, the anchoring part of the locking member and the engaging projection part of the slide member are correctly opposed to each other, so that the slide member never fails to be locked in the position in which the IC card is loaded. Even if the friction static friction of the slide member is larger than the return force of the return spring, the slide member never fails to be moved in the IC card eject direction.

The integration of the anchoring part, the turning operation part, and the pressing operation part with the locking member simplifies the construction of the IC card connector.

At one end of the slide member are formed the engaging projection part engaged in the anchoring part and a pressing part abutted against the pressing operation part, and when the slide member is moved in the IC card insert direction and the anchoring part and the engaging projection part are engaged in each other, the locking member is turnably supported on a fixing member so that the pressing operation part and the pressing part are opposed to each other in a position close to each other. Thereby, the slide member can be securely locked with a simple construction.

Since the fixing member is formed on the housing or a frame attached to the housing, the IC card connector can be constructionally simplified and inexpensively manufactured.

The slide member is provided with a turnable eject arm, which is engaged in the IC card loaded in or unloaded from the housing. With this construction, as the IC card is inserted or ejected, the slide member slides in an insert or eject direction. As a result, the IC card can be easily inserted and ejected to and from the housing, and operations can be correctly performed.

First and second arm parts are formed on the eject arm, and when the IC card is inserted, the first arm part engages in the IC card so that the slide member is moved in the IC card insert direction; and when the IC card is ejected, the second arm part engages in the IC card so that the slide member is moved in the IC card eject direction, while, when the slide member has been moved up to an IC card eject position, the eject arm turns, whereby the IC card can be pulled out. This construction permits the IC card to be correctly inserted, and prevents the IC card 3 from popping out of the housing part of the housing when the slide member is moving in the IC card eject direction from the state in which the IC card is loaded.

What is claimed is:

1. An IC card connector, including:
   a slide member that is slidable in directions in which an IC card loaded in and unloaded from a housing is inserted and ejected;
   a return spring for energizing the slide member in the direction in which the IC card is ejected; and
   a locking member for holding the slide member in a position in which the IC card is loaded, against an energizing force of the return spring,
   wherein the locking member comprises:
      an anchoring part that is turnably supported and can be engaged in and disengaged from the slide member;
      a turning operation part for turning the anchoring part in a direction in which the anchoring part is disengaged from the slide member; and
      a pressing operation part that abuts the slide member, and engages the anchoring part in the slide member in accordance with a movement of the slide member in the IC card insert direction and presses the slide member in the IC card eject direction in accordance with a movement of the turning operation part.

2. The IC card connector according to claim 1, wherein the anchoring part, the burning operation part, and the pressing operation part are formed integrally with the locking member.

3. The IC card connector according to claim 1, wherein at one end of the slide member are formed an engaging projection part engaged in the anchoring part and a pressing part abutting the pressing operation part, wherein, when the slide member is moved in the IC card insert direction and the anchoring part and the engaging projection part are engaged in each other, the locking member is turnably supported on a fixing member so that the pressing operation part and the pressing part are opposed to each other in a position close to each other.

4. The IC card connector according to claim 3, wherein the fixing member is formed on one of the housing and a frame attached to the housing.

5. The IC card connector according to claim 1, wherein the slide member is provided with a turnable eject arm, which is engaged in the IC card loaded in or unloaded from the housing, whereby as the IC card is inserted or ejected, the slide member slides in an insert or eject direction through the eject arm.

6. The IC card connector according to claim 5, wherein first and second arm parts are formed on the eject arm, and when the IC card is inserted, the first arm part engages in the IC card and thereby the slide member is moved in an IC card insert direction; and when the IC card is ejected, the second arm part engages in the IC card and thereby the slide member is moved in an IC card eject direction, while, when the slide member has been moved up to an IC card eject position, the eject arm turns, whereby the IC card can be pulled out.

* * * * *

UNITED STATES PATENT AND TRADEMARK OFFICE
CERTIFICATE OF CORRECTION

PATENT NO. : 6,270,365 B1
DATED : August 7, 2001
INVENTOR(S) : Toru Nishioka

It is certified that error appears in the above-identified patent and that said Letters Patent is hereby corrected as shown below:

Column 9,
Line 28, delete "burning" and substitute -- turning -- in its place.

Signed and Sealed this

Twenty-eighth Day of May, 2002

Attest:

JAMES E. ROGAN
Attesting Officer       Director of the United States Patent and Trademark Office